(12) United States Patent
Araya et al.

(10) Patent No.: US 9,057,257 B2
(45) Date of Patent: Jun. 16, 2015

(54) PRODUCING OIL AND/OR GAS WITH EMULSION COMPRISING MISCIBLE SOLVENT

(75) Inventors: Miguel Antonio Araya, Katy, TX (US); Sheila Teresa Dubey, Sugar Land, TX (US)

(73) Assignee: Shell Oil Company, Houston, TX (US)

( * ) Notice: Subject to any disclaimer, the term of this patent is extended or adjusted under 35 U.S.C. 154(b) by 1001 days.

(21) Appl. No.: 12/743,317

(22) PCT Filed: Nov. 18, 2008

(86) PCT No.: PCT/US2008/083851
§ 371 (c)(1),
(2), (4) Date: Apr. 4, 2011

(87) PCT Pub. No.: WO2009/067423
PCT Pub. Date: May 28, 2009

(65) Prior Publication Data
US 2011/0272137 A1    Nov. 10, 2011

Related U.S. Application Data

(60) Provisional application No. 60/988,848, filed on Nov. 19, 2007.

(51) Int. Cl.
*E21B 43/22*     (2006.01)
*E21B 43/16*     (2006.01)
*C09K 8/58*      (2006.01)
*C09K 8/584*     (2006.01)

(52) U.S. Cl.
CPC . *E21B 43/16* (2013.01); *C09K 8/58* (2013.01); *C09K 8/584* (2013.01)

(58) Field of Classification Search
None
See application file for complete search history.

(56) References Cited

U.S. PATENT DOCUMENTS

| | | | |
|---|---|---|---|
| 2,330,934 A | 10/1943 | Thacker | 23/206 |
| 2,492,719 A | 12/1949 | Thacker | 23/206 |
| 2,636,810 A | 4/1953 | Marisic | 23/206 |
| 2,670,801 A | 3/1954 | Sherborne | 166/21 |
| 3,087,788 A | 4/1963 | Porter | 23/181 |
| 3,250,595 A | 5/1966 | Olsen | |
| 3,345,135 A | 10/1967 | Kerr et al. | 23/206 |

(Continued)

FOREIGN PATENT DOCUMENTS

| | | | |
|---|---|---|---|
| CA | 738784 | 7/1966 | |
| EP | 581026 | 2/1994 | C01B 17/04 |

(Continued)

OTHER PUBLICATIONS

Carbon Disulfide, "4.Production, Import, Use, and Disposal", XP007908050, pp. 119-125, Jun. 29, 2001.

*Primary Examiner* — Angela M DiTrani
*Assistant Examiner* — Anuradha Ahuja

(57) ABSTRACT

A system for producing oil and/or gas from an underground formation comprising a miscible solvent source (202); an emulsion manufacturer (204) to produce an emulsion comprising the miscible solvent; an emulsion storage facility (206) adapted to store at least about 5000 gallons of the emulsion; a first array of wells (432) dispersed above the formation; a second array of wells (412) dispersed above the formation; wherein the first array of wells comprises a mechanism to inject the miscible solvent and/or the emulsion into the formation while the second array of wells comprises a mechanism to produce oil and/or gas from the formation.

18 Claims, 5 Drawing Sheets

(56) References Cited

U.S. PATENT DOCUMENTS

| | | | |
|---|---|---|---|
| 3,366,452 A | 1/1968 | Lauer | 23/204 |
| 3,393,733 A | 7/1968 | Kuo et al. | 166/8 |
| 3,402,768 A | 9/1968 | Felsenthal et al. | 166/2 |
| 3,454,095 A * | 7/1969 | Webster et al. | 166/303 |
| 3,498,378 A | 3/1970 | Stone et al. | 166/263 |
| 3,537,520 A * | 11/1970 | Holm | 166/400 |
| 3,581,821 A | 6/1971 | Ross | 166/245 |
| 3,647,906 A | 3/1972 | Farley | 260/683 D |
| 3,664,419 A * | 5/1972 | Holm | 166/270.1 |
| 3,672,448 A | 6/1972 | Hoyt | 166/245 |
| 3,724,552 A | 4/1973 | Snavely, Jr. | |
| 3,724,553 A | 4/1973 | Snavely, Jr. et al. | 166/304 |
| 3,729,053 A | 4/1973 | Froning | 166/304 |
| 3,732,166 A | 5/1973 | Lissant | |
| 3,754,598 A | 8/1973 | Holloway, Jr. | 166/249 |
| 3,769,209 A * | 10/1973 | Holm | 507/259 |
| 3,794,114 A | 2/1974 | Brandon | 166/249 |
| 3,805,892 A | 4/1974 | Haynes, Jr. | 166/245 |
| 3,822,748 A | 7/1974 | Allen et al. | 166/269 |
| 3,823,777 A * | 7/1974 | Allen et al. | 166/266 |
| 3,838,738 A | 10/1974 | Redford et al. | 166/271 |
| 3,840,073 A | 10/1974 | Allen et al. | 166/274 |
| 3,847,221 A | 11/1974 | Allen et al. | 166/274 |
| 3,850,245 A | 11/1974 | Allen et al. | 166/274 |
| 3,878,892 A | 4/1975 | Allen et al. | 166/267 |
| 3,927,185 A | 12/1975 | Meadow et al. | 423/443 |
| 3,943,160 A | 3/1976 | Farmer, III et al. | 260/458 |
| 3,946,812 A | 3/1976 | Gale et al. | 166/274 |
| 4,008,764 A | 2/1977 | Allen | 166/266 |
| 4,011,908 A * | 3/1977 | Holm | 166/270.1 |
| 4,057,613 A | 11/1977 | Meadow et al. | 423/443 |
| 4,077,471 A | 3/1978 | Shupe et al. | 166/275 |
| 4,122,156 A | 10/1978 | Kittrell et al. | 423/443 |
| 4,182,416 A | 1/1980 | Trantham et al. | 166/245 |
| 4,216,079 A | 8/1980 | Newcombe | 208/188 |
| 4,305,463 A | 12/1981 | Zakiewicz | 106/284 |
| 4,330,038 A | 5/1982 | Soukup et al. | 166/267 |
| 4,393,937 A | 7/1983 | Dilgren et al. | 166/272 |
| 4,476,113 A | 10/1984 | Young et al. | 424/161 |
| 4,488,976 A | 12/1984 | Dilgren et al. | 252/8.55 D |
| 4,543,434 A | 9/1985 | Chang | 585/310 |
| 4,550,779 A | 11/1985 | Zakiewicz | 166/248 |
| 4,603,154 A * | 7/1986 | Luetzelschwab | 523/313 |
| 4,727,937 A | 3/1988 | Shum et al. | 166/245 |
| 4,822,938 A | 4/1989 | Audeh et al. | 585/437 |
| 4,963,340 A | 10/1990 | Audeh et al. | 423/444 |
| 5,014,784 A | 5/1991 | Shen | 166/263 |
| 5,062,970 A | 11/1991 | Muijs et al. | 252/8.554 |
| 5,065,821 A | 11/1991 | Huang et al. | 166/245 |
| 5,076,358 A | 12/1991 | Kissel | |
| 5,104,516 A * | 4/1992 | de Bruijn et al. | 208/107 |
| 5,120,935 A | 6/1992 | Nenniger | 392/305 |
| 5,167,280 A | 12/1992 | Sanchez et al. | 166/267 |
| 5,247,994 A * | 9/1993 | Nenniger | 166/303 |
| 5,318,709 A | 6/1994 | Wuest et al. | 252/8.554 |
| 5,607,016 A | 3/1997 | Butler | 166/263 |
| 5,609,845 A | 3/1997 | Cimini et al. | 423/648.1 |
| 5,723,423 A | 3/1998 | Van Slyke | 510/188 |
| 5,803,171 A | 9/1998 | McCaffery et al. | 166/245 |
| 5,826,656 A | 10/1998 | McGuire et al. | 166/305.1 |
| 6,022,834 A | 2/2000 | Hsu et al. | 507/259 |
| 6,136,282 A | 10/2000 | Fisher | 423/220 |
| 6,149,344 A | 11/2000 | Eaton | 405/128 |
| 6,241,019 B1 | 6/2001 | Davidson et al. | 166/249 |
| 6,269,881 B1 | 8/2001 | Chou et al. | 166/270.1 |
| 6,405,797 B2 | 6/2002 | Davidson et al. | 166/249 |
| 6,497,855 B1 | 12/2002 | Wachs | 423/648.1 |
| 6,506,349 B1 | 1/2003 | Khanmamedov | 423/210 |
| 6,706,108 B2 | 3/2004 | Polston | 106/285 |
| 6,851,473 B2 | 2/2005 | Davidson | 166/263 |
| 6,893,620 B2 | 5/2005 | Watson et al. | 423/224 |
| 6,919,059 B2 | 7/2005 | Watson et al. | 423/224 |
| 6,919,296 B2 | 7/2005 | Geus et al. | 502/325 |
| 6,946,111 B2 | 9/2005 | Keller et al. | 423/576.2 |
| 7,025,134 B2 | 4/2006 | Byrd et al. | 166/105 |
| 7,090,818 B2 | 8/2006 | Stauffer | 423/443 |
| 7,128,150 B2 | 10/2006 | Thomas et al. | 166/266 |
| 7,426,959 B2 | 9/2008 | Wang et al. | 166/52 |
| 7,601,320 B2 | 10/2009 | Van Dorp et al. | 423/443 |
| 7,654,322 B2 | 2/2010 | Wang et al. | 166/266 |
| 2003/0194366 A1 | 10/2003 | Srinivas et al. | 423/230 |
| 2004/0146288 A1 | 7/2004 | Vinegar et al. | 392/301 |
| 2004/0159583 A1 | 8/2004 | Mesters et al. | 208/208 |
| 2005/0189108 A1 | 9/2005 | Davidson | 166/249 |
| 2006/0254769 A1* | 11/2006 | Wang et al. | 166/266 |
| 2007/0251686 A1 | 11/2007 | Sivrikoz et al. | 166/249 |
| 2008/0023198 A1 | 1/2008 | Hsu | 166/268 |
| 2008/0087425 A1 | 4/2008 | Hsu et al. | 166/266 |

FOREIGN PATENT DOCUMENTS

| | | | |
|---|---|---|---|
| GB | 1007674 | 10/1965 | |
| GB | 2379685 | 3/2003 | E21B 43/16 |
| WO | WO9619638 | 6/1996 | E21B 43/22 |
| WO | WO9850679 | 11/1998 | E21B 43/40 |
| WO | WO03095118 | 11/2003 | B09C 1/00 |
| WO | WO2007013177 | 11/2007 | C01B 31/26 |
| WO | WO2007127766 | 11/2007 | E21B 43/16 |
| WO | WO2007131976 | 11/2007 | C01B 31/26 |
| WO | WO2007131977 | 11/2007 | E21B 43/16 |
| WO | WO2008003732 | 1/2008 | C01B 31/26 |
| WO | WO2008034777 | 3/2008 | C01B 31/26 |

* cited by examiner

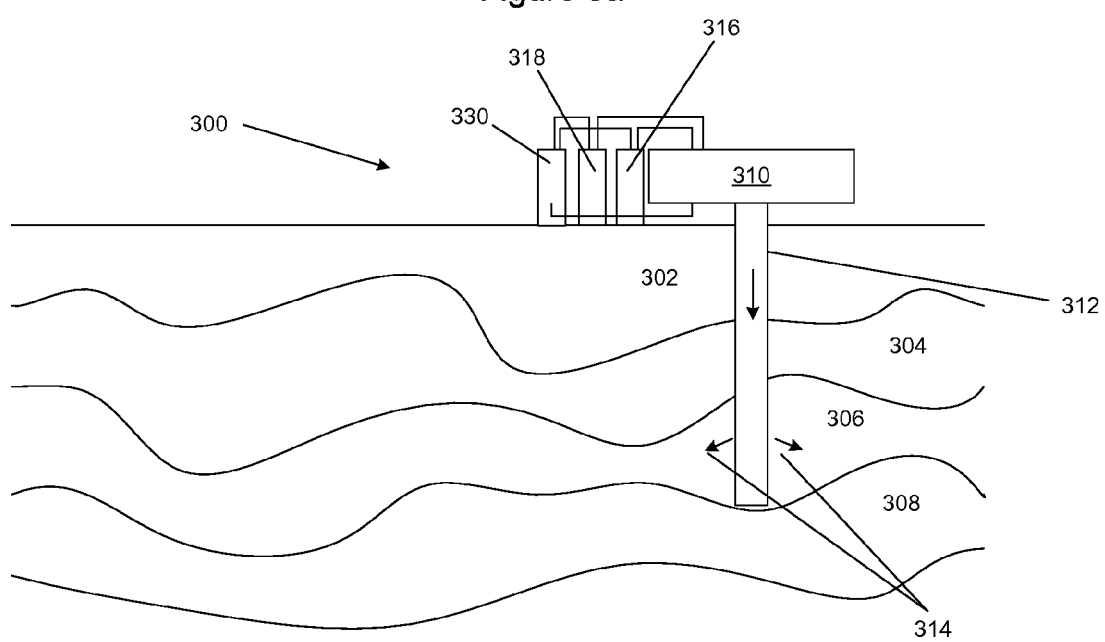

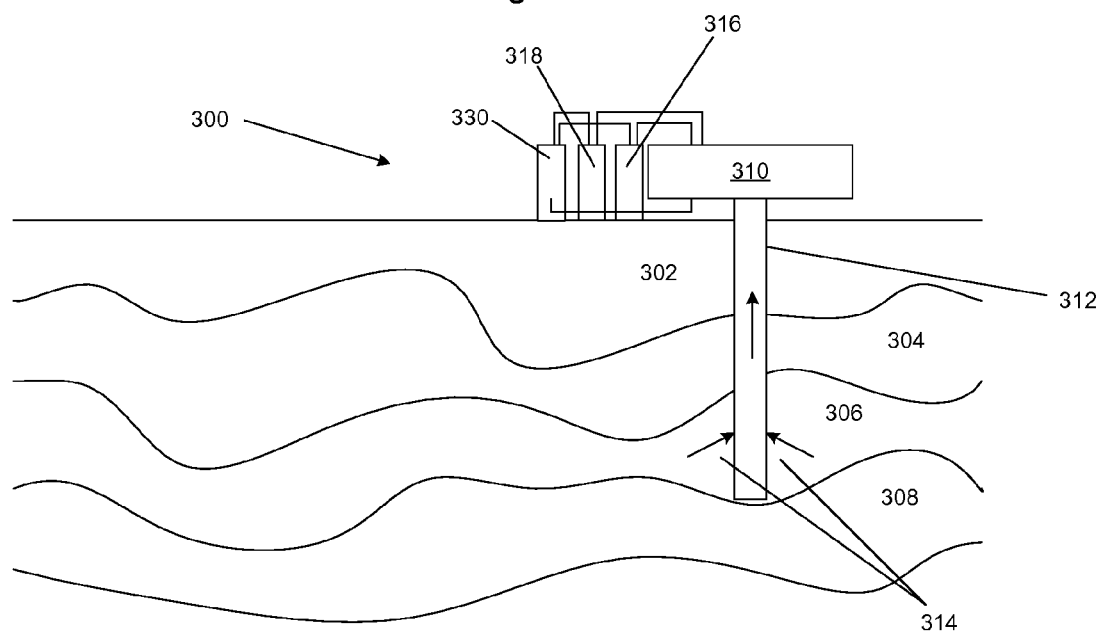

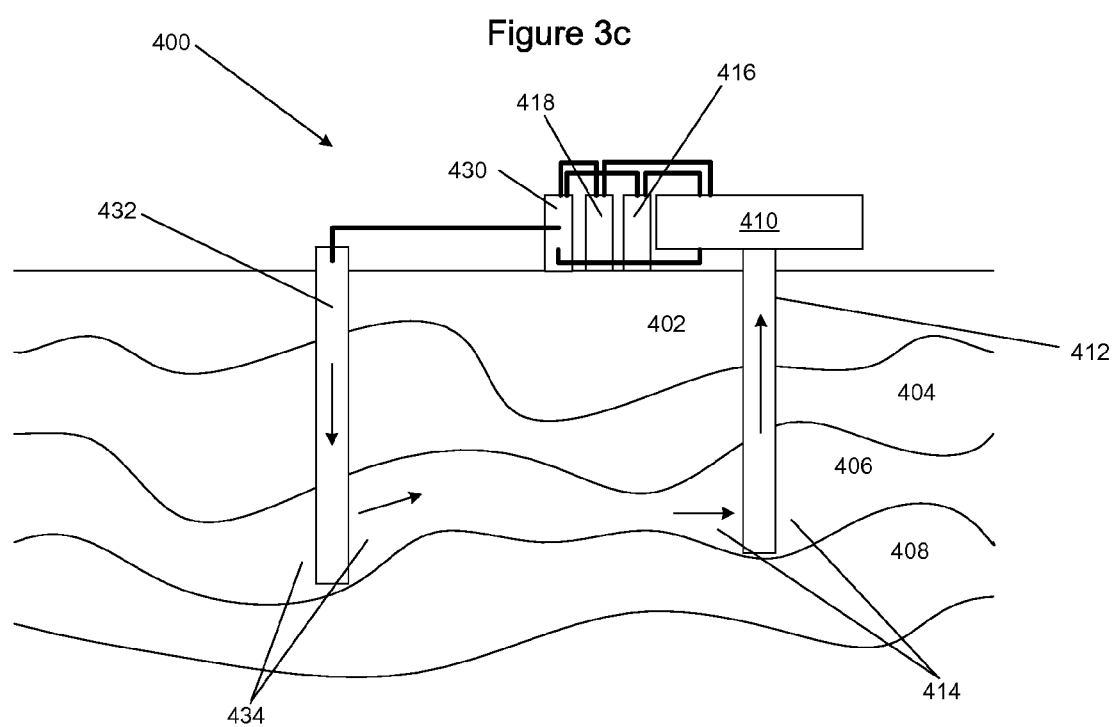

PRODUCING OIL AND/OR GAS WITH EMULSION COMPRISING MISCIBLE SOLVENT

PRIORITY CLAIM

The present application claims priority of US Provisional Patent Applications No. 60/988,848 filed 19 Nov. 2007.

FIELD OF THE INVENTION

The present disclosure relates to systems and methods for producing oil and/or gas.

BACKGROUND OF THE INVENTION

Enhanced Oil Recovery (EOR) may be used to increase oil recovery in fields worldwide. There are three main types of EOR, thermal, chemical/polymer and gas injection, which may be used to increase oil recovery from a reservoir, beyond what can be achieved by conventional means—possibly extending the life of a field and boosting the oil recovery factor.

Thermal enhanced recovery works by adding heat to the reservoir. The most widely practised form is a steamdrive, which reduces oil viscosity so that it can flow to the producing wells. Chemical flooding increases recovery by reducing the capillary forces that trap residual oil. Polymer flooding improves the sweep efficiency of injected water. Miscible injection works in a similar way to chemical flooding. By injecting a fluid that is miscible with the oil, trapped residual oil can be recovered.

Referring to FIG. 1, there is illustrated prior art system 100. System 100 includes underground formation 102, underground formation 104, underground formation 106, and underground formation 108. Production facility 110 is provided at the surface. Well 112 traverses formations 102 and 104, and terminates in formation 106. The portion of formation 106 is shown at 114. Oil and gas are produced from formation 106 through well 112, to production facility 110. Gas and liquid are separated from each other, gas is stored in gas storage 116 and liquid is stored in liquid storage 118.

U.S. Pat. No. 3,732,166 discloses Non-Newtonian formulations containing carbon disulfide (CS2) of reduced toxicity and flammability. These formulations are illustrated by high internal phase ratio (HIPR) emulsions containing carbon disulfide in the internal phase, said internal phase containing more than about 60% of the formulation by volume and preferably more than about 80% of the formulation by volume. These formulations are particularly useful in cleaning oil and gas wells by the removal of wax and/or sulfur. U.S. Pat. No. 3,732,166 is herein incorporated by reference in its entirety.

Co-pending U.S. Pat. No. 7,426,959, and having discloses a system including a mechanism for recovering oil and/or gas from an underground formation, the oil and/or gas comprising one or more sulfur compounds; a mechanism for converting at least a portion of the sulfur compounds from the recovered oil and/or gas into a carbon disulfide formulation; and a mechanism for releasing at least a portion of the carbon disulfide formulation into a formation. U.S. Pat. No. 7,426,959 which is herein incorporated by reference in its entirety.

U.S. Pat. No. 5,062,970 discloses a surfactant composition, suitable for enhanced oil recovery comprising in a 60:40 to 10/90 weight ratio a) (o,m)- and/or (o,p)-dialkylbenzene alkali sulfonate and b) polyalkoxyphenyl ether alkali sulfonate. U.S. Pat. No. 5,062,970 is herein incorporated by reference in its entirety.

Other compositions and methods for enhanced hydrocarbons recovery are described in U.S. Pat. No. 3,943,160; U.S. Pat. No. 3,946,812; U.S. Pat. No. 4,077,471; U.S. Pat. No. 4,216,079; U.S. Pat. No. 5,318,709; U.S. Pat. No. 5,723,423; U.S. Pat. No. 6,022,834; U.S. Pat. No. 6,269,881; and by Wellington, et al. in "Low Surfactant Concentration Enhanced Waterflooding," Society of Petroleum Engineers, 1995; all of which are incorporated by reference herein.

There is a need in the art for improved systems and methods for enhanced oil recovery. There is a further need in the art for improved systems and methods for enhanced oil recovery using a solvent, for example through viscosity reduction, chemical effects, and miscible flooding. There is a further need in the art for improved systems and methods for solvent miscible flooding. There is a further need in the art for improved systems and methods for storing a solvent prior to and/or after miscible flooding. There is a further need in the art for improved systems and methods for transporting a solvent prior to and/or after miscible flooding.

SUMMARY OF THE INVENTION

In one aspect, the invention provides a system for producing oil and/or gas from an underground formation comprising a miscible solvent source; an emulsion manufacturer to produce an emulsion comprising the miscible solvent; an emulsion storage facility adapted to store at least about 5000 gallons of the emulsion; a first array of wells dispersed above the formation; a second array of wells dispersed above the formation; wherein the first array of wells comprises a mechanism to inject the miscible solvent and/or the emulsion into the formation while the second array of wells comprises a mechanism to produce oil and/or gas from the formation.

In another aspect, the invention provides a system for producing oil and/or gas from an underground formation comprising a miscible solvent source; an emulsion manufacturer to produce an emulsion comprising the miscible solvent; an emulsion transportation facility adapted to transport the emulsion at least about 10 kilometers to the underground formation; a first array of wells dispersed above the formation; a second array of wells dispersed above the formation; wherein the first array of wells comprises a mechanism to inject the miscible solvent and/or the emulsion into the formation while the second array of wells comprises a mechanism to produce oil and/or gas from the formation.

Advantages of the invention include one or more of the following:

Improved systems and methods for enhanced recovery of hydrocarbons from a formation with a solvent.

Improved systems and methods for enhanced recovery of hydrocarbons from a formation with a fluid containing a miscible solvent.

Improved compositions and/or techniques for secondary recovery of hydrocarbons.

Improved systems and methods for enhanced oil recovery.

Improved systems and methods for enhanced oil recovery using a miscible solvent.

Improved systems and methods for enhanced oil recovery using a compound which may be miscible with oil in place.

Improved systems and methods for storing a compound which may be miscible with oil in place.

Improved systems and methods for transporting a compound which may be miscible with oil in place.

BRIEF DESCRIPTION OF THE DRAWINGS

FIGS. 3a-3c illustrate oil and/or gas production systems.

DETAILED DESCRIPTION OF THE INVENTION

Figure 1:
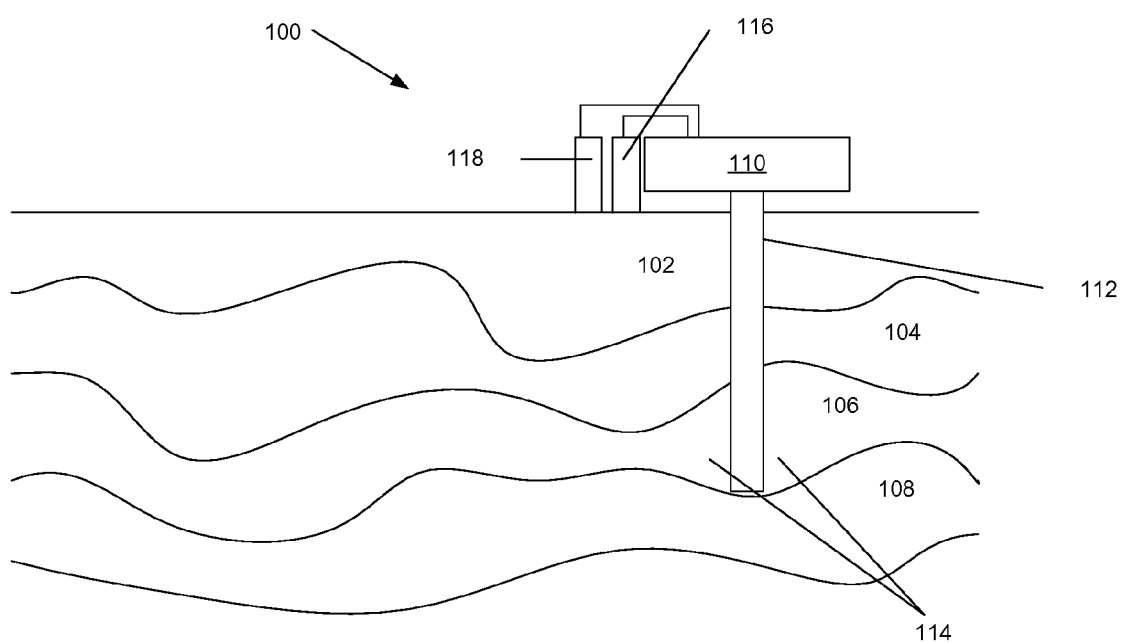
FIG. 1 illustrates an oil and/or gas production system.
Figure 2:
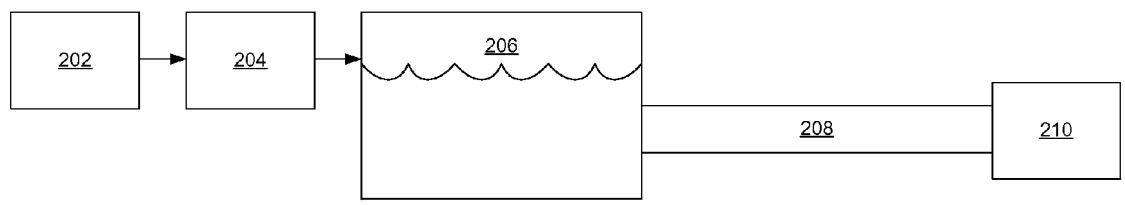
FIG. 2a illustrates a well pattern.
FIGS. 2b and 2c illustrate the well pattern of FIG. 2a during enhanced oil recovery processes.

FIG. 2:

Referring now to FIG. 2, in some embodiments, a solvent storage and/or transportation system 200 is illustrated. System 200 includes solvent manufacturing 202, emulsion manufacturing 204, emulsion storage 206, emulsion transportation 208, and end use 210.

Solvent Manufacturing 202

Solvent manufacturing 202 may be any conventional method of manufacturing a solvent that can be used in an enhanced oil recovery process. Alternatively, the solvent can be purchased from a solvent manufacturer.

One suitable solvent is carbon disulfide, or solvent mixtures containing carbon disulfide. In one embodiment, a sulfur source and a carbon source are provided, and any known reactions and processes may be used to make carbon disulfide, or solvent mixtures containing carbon disulfide. The choice of the method to make carbon disulfide, or solvent mixtures containing carbon disulfide is not critical. Several suitable systems, methods and processes to manufacture carbon disulfide, or solvent mixtures containing carbon disulfide, are disclosed in co-pending U.S. Pat. No. 7,426,959, and having which is herein incorporated by reference in its entirety.

Emulsion Manufacturing 204

Emulsion manufacturing 204 may be any method of making an emulsion of a solvent that can be used in an enhanced oil recovery process. One suitable solvent is carbon disulfide, or solvent mixtures containing carbon disulfide.

In one embodiment, several suitable emulsions and methods for making them are disclosed in U.S. Pat. No. 3,732,166 which is herein incorporated by reference in its entirety.

In another embodiment, a high internal ratio solvent emulsion can be made by mixing from about 50% to about 99%, or from about 60% to about 90%, or from about 70% to about 85% by volume of a solvent, for example CS2 or a CS2 containing mixture; from about 0.5% to about 50%, or from about 5% to about 30%, or from about 10% to about 25% by volume of another fluid, for example water or brine; and from about 0.025% to about 30%, or from about 0.05% to about 20%, or from about 0.5% to about 15% by volume of a surfactant.

Suitable surfactants include anionic, cationic, non-ionic, or zwitterionic surfactants, or mixtures thereof. Other suitable surfactants include Neodol 1-12, Neodol 5-20 commercially available from Shell Chemical Company of Houston, Tex., USA. Other suitable surfactants include Igepal CA 630 commercially available from Stepan Company of Northfield, Ill., USA. Other suitable surfactants include Plurafac D25 commercially available from BASF of Belvidere, N.J., USA. Other suitable surfactants include Tergitol 15-S-5 commercially available from DOW Chemical of Midland, Mich., USA.

The selection of the method to make the emulsion is not critical. Suitable methods to make the emulsion are to thoroughly mix the components using a blender, stirrer, homogenizer, an industrial mixer, or with a method of high pressure homogenization. The dispersion equipment speed could be moderate or high. The emulsion could be made in batches or in a continuous in-line process.

Emulsion Storage 206

Emulsion storage 206 can include any suitable container to store emulsions and/or solvents. Storage 206 may have a volume of at least about 5000 gallons, for example at least about 10,000, 20,000, 50,000, 100,000, 500,000, or 1,000,000 gallons.

Storage 206 may be a steel or stainless steel tank, and may be provided with one or more coatings and/or liners as are known in the art.

Storage 206 may be a stationary fixture, or may be a mobile container such as a tanker truck, a rail car, an intermodal container, or a ship.

Storage 206 may be located adjacent emulsion manufacturing 204, and then the emulsion may be conveyed by emulsion transportation 208 to an end use. Alternatively, storage may be located adjacent end use 210. Alternatively, storage may be co-located with emulsion transportation 208 such as a tanker truck or rail car, as discussed above.

Emulsion may be stored in storage 206 for a period of at least about 1 week, or at least about 2 weeks, 1 month, 3 months, 6 months, or 1 year, while still remaining an emulsion.

Emulsion Transportation 208:

Emulsion transportation 208 may be used to convey emulsion from emulsion manufacturing 204 and/or emulsion storage 206 to end use 210. Suitable transportation 208 includes a pipe or pipeline, or a moveable storage tank.

In one embodiment, transportation 208 is at least about 5 kilometers (km) between emulsion manufacturing 204 and/or emulsion storage 206 to end use 210, or at least about 10, 25, 50, 100, 250, 500, 1000, or 2000 km.

End Use 210:

End use 210 may include an emulsion breaker and an enhanced oil recovery process with the solvent. Suitable methods to break the emulsion include high temperature treatment, salting out, and/or changing the pH of the emulsion. Suitable enhanced oil recovery processes are disclosed in co-pending U.S. Pat. No. 7,426,959, and having which is herein incorporated by reference in its entirety.

In one embodiment, the emulsion can be broken, and then the solvent used in an enhanced oil recovery process. In another embodiment, the emulsion can be released in a hydrocarbon containing formation, and then the emulsion can be broken in situ within the formation.

FIGS. 3a and 3b:

Referring now to FIGS. 3a and 3b, in some embodiments of the invention, system 300 is illustrated. System 300 may be a part of one suitable end use 210. System 300 includes underground formation 302, underground formation 304, underground formation 306, and underground formation 308. Facility 310 may be provided at the surface. Well 312 traverses formations 302 and 304, and has openings in formation 306. Portions 314 of formation 306 may be optionally fractured and/or perforated. During primary production, oil and gas from formation 306 may be produced into portions 314, into well 312, and travels up to facility 310. Facility 310 then separates gas, which may be sent to gas processing 316, and liquid, which may be sent to liquid storage 318. Facility 310 also includes enhanced oil recovery solvent storage 330. As shown in FIG. 3a, enhanced oil recovery solvent may be pumped down well 312 that is shown by the down arrow and pumped into formation 306. Enhanced oil recovery solvent may be left to soak in formation for a period of time from about 1 hour to about 15 days, for example from about 5 to about 50 hours.

After the soaking period, as shown in FIG. 3b, enhanced oil recovery solvent and oil and/or gas may be then produced back up well 312 to facility 310. Facility 310 may be adapted to separate and/or recycle enhanced oil recovery solvent, for example by boiling the formulation, condensing it or filtering or reacting it, then re-injecting the formulation into well 312, for example by repeating the soaking cycle shown in FIGS. 3a and 3b from about 2 to about 5 times.

In some embodiments, enhanced oil recovery solvent may be pumped into formation 306 below the fracture pressure of the formation, for example from about 40% to about 90% of the fracture pressure.

FIG. 3c:

Referring now to FIG. 3c, in some embodiments of the invention, system 400 is illustrated. System 400 includes underground formation 402, formation 404, formation 406, and formation 408. Production facility 410 may be provided at the surface. Well 412 traverses formation 402 and 404 has openings at formation 406. Portions of formation 414 may be optionally fractured and/or perforated. As oil and gas is produced from formation 406 it enters portions 414, and travels up well 412 to production facility 410. Gas and liquid may be separated, and gas may be sent to gas storage 416, and liquid may be sent to liquid storage 418. Production facility 410 may be able to produce and/or store enhanced oil recovery solvent, which may be produced and stored in production/storage 430. Hydrogen sulfide and/or other sulfur containing compounds from well 412 may be sent to enhanced oil recovery solvent production/storage 430. Enhanced oil recovery solvent may be pumped down well 432, to portions 434 of formation 406. Enhanced oil recovery solvent traverses formation 406 to aid in the production of oil and gas, and then the enhanced oil recovery solvent, oil and/or gas may all be produced to well 412, to production facility 410. Enhanced oil recovery solvent may then be recycled, for example by boiling the formulation, condensing it or filtering or reacting it, then re-injecting the formulation into well 432.

In some embodiments, a quantity of enhanced oil recovery solvent or enhanced oil recovery solvent mixed with other components may be injected into well 432, followed by another component to force enhanced oil recovery solvent or enhanced oil recovery solvent mixed with other components across formation 406, for example air; water in gas or liquid form; water mixed with one or more salts, polymers, and/or surfactants; carbon dioxide; other gases; other liquids; and/or mixtures thereof.

Surfactants:

In one embodiment, suitable surfactants include aqueous surfactant solutions. Suitable aqueous surfactant solutions are disclosed in U.S. Pat. No. 3,943,160; U.S. Pat. No. 3,946,812; U.S. Pat. No. 4,077,471; U.S. Pat. No. 4,216,079; U.S. Pat. No. 5,318,709; U.S. Pat. No. 5,723,423; U.S. Pat. No. 6,022,834; U.S. Pat. No. 6,269,881; and by Wellington, et al. in "Low Surfactant Concentration Enhanced Waterflooding," Society of Petroleum Engineers, 1995; all of which are incorporated by reference herein. In another embodiment, surfactants are not soluble in water.

Alternative Embodiments

In some embodiments, oil and/or gas may be recovered from a formation into a well, and flow through the well and flowline to a facility. In some embodiments, enhanced oil recovery, with the use of an agent for example steam, water, a surfactant, a polymer flood, and/or a miscible agent such as a carbon disulfide formulation or carbon dioxide, may be used to increase the flow of oil and/or gas from the formation.

In some embodiments, oil and/or gas recovered from a formation may include a sulfur compound. The sulfur compound may include hydrogen sulfide, mercaptans, sulfides and disulfides other than hydrogen disulfide, or heterocyclic sulfur compounds for example thiophenes, benzothiophenes, or substituted and condensed ring dibenzothiophenes, or mixtures thereof.

In some embodiments, a sulfur compound from the formation may be converted into a carbon disulfide formulation. The conversion of at least a portion of the sulfur compound into a carbon disulfide formulation may be accomplished by any known method. Suitable methods may include oxidation reaction of the sulfur compound to sulfur and/or sulfur dioxides, and by reaction of sulfur and/or sulfur dioxide with carbon and/or a carbon containing compound to form the carbon disulfide formulation. The selection of the method used to convert at least a portion of the sulfur compound into a carbon disulfide formulation is not critical.

In some embodiments, a suitable miscible enhanced oil recovery agent may be a carbon disulfide formulation. The carbon disulfide formulation may include carbon disulfide and/or carbon disulfide derivatives for example, thiocarbonates, xanthates and mixtures thereof; and optionally one or more of the following: hydrogen sulfide, sulfur, carbon dioxide, hydrocarbons, and mixtures thereof.

In some embodiments, a suitable method of producing a carbon disulfide formulation is disclosed in copending U.S. Pat. No. 7,426,959, having which is herein incorporated by reference in its entirety.

In some embodiments, suitable miscible enhanced oil recovery agents include carbon disulfide, hydrogen sulfide, carbon dioxide, octane, pentane, LPG, C2-C6 aliphatic hydrocarbons, nitrogen, diesel, mineral spirits, naptha solvent, asphalt solvent, kerosene, acetone, xylene, trichloroethane, or mixtures of two or more of the preceding, or other miscible enhanced oil recovery agents as are known in the art. In some embodiments, suitable miscible enhanced oil recovery agents are first contact miscible or multiple contact miscible with oil in the formation.

In some embodiments, suitable immiscible enhanced oil recovery agents include water in gas or liquid form, air, mixtures of two or more of the preceding, or other immiscible enhanced oil recovery agents as are known in the art. In some embodiments, suitable immiscible enhanced oil recovery agents are not first contact miscible or multiple contact miscible with oil in the formation.

In some embodiments, immiscible and/or miscible enhanced oil recovery agents injected into the formation may be recovered from the produced oil and/or gas and re-injected into the formation.

In some embodiments, oil as present in the formation prior to the injection of any enhanced oil recovery agents has a viscosity of at least about 100 centipoise, or at least about 500 centipoise, or at least about 1000 centipoise, or at least about 2000 centipoise, or at least about 5000 centipoise, or at least about 10,000 centipoise. In some embodiments, oil as present in the formation prior to the injection of any enhanced oil recovery agents has a viscosity of up to about 5,000,000 centipoise, or up to about 2,000,000 centipoise, or up to about 1,000,000 centipoise, or up to about 500,000 centipoise.

Releasing at least a portion of the miscible enhanced oil recovery agent and/or other liquids and/or gases may be accomplished by any known method. One suitable method is injecting the enhanced oil recovery solvent into a single conduit in a single well, allowing carbon disulfide formulation to soak, and then pumping out at least a portion of the carbon disulfide formulation with gas and/or liquids. Another suitable method is injecting the enhanced oil recovery solvent into a first well, and pumping out at least a portion of the enhanced oil recovery solvent with gas and/or liquids through a second well. The selection of the method used to inject at least a portion of the enhanced oil recovery solvent and/or other liquids and/or gases is not critical.

In some embodiments, the enhanced oil recovery solvent and/or other liquids and/or gases may be pumped into a formation at a pressure up to the fracture pressure of the formation.

In some embodiments, the enhanced oil recovery solvent may be mixed in with oil and/or gas in a formation to form a mixture which may be recovered from a well. In some embodiments, a quantity of the enhanced oil recovery solvent may be injected into a well, followed by another component to force carbon the formulation across the formation. For example air, water in liquid or vapor form, carbon dioxide, other gases, other liquids, and/or mixtures thereof may be used to force the enhanced oil recovery solvent across the formation.

In some embodiments, the enhanced oil recovery solvent may be heated prior to being injected into the formation to lower the viscosity of fluids in the formation, for example heavy oils, paraffins, asphaltenes, etc.

In some embodiments, the enhanced oil recovery solvent may be heated and/or boiled while within the formation, with the use of a heated fluid or a heater, to lower the viscosity of fluids in the formation. In some embodiments, heated water and/or steam may be used to heat and/or vaporize the enhanced oil recovery solvent in the formation.

In some embodiments, the enhanced oil recovery solvent may be heated and/or boiled while within the formation, with the use of a heater. One suitable heater is disclosed in copending United States Publication Number US2004/0146288, published Jul. 29, 2004, and having a which is herein incorporated by reference in its entirety.

In some embodiments, oil and/or gas produced may be transported to a refinery and/or a treatment facility. The oil and/or gas may be processed to produced to produce commercial products such as transportation fuels such as gasoline and diesel, heating fuel, lubricants, chemicals, and/or polymers. Processing may include distilling and/or fractionally distilling the oil and/or gas to produce one or more distillate fractions. In some embodiments, the oil and/or gas, and/or the one or more distillate fractions may be subjected to a process of one or more of the following: catalytic cracking, hydrocracking, hydrotreating, coking, thermal cracking, distilling, reforming, polymerization, isomerization, alkylation, blending, and dewaxing.

EXAMPLES

The initial test conditions included:
Total volume of 40.0 ml (CS2+water+surfactant).
CS2 volume fraction of 75% before shearing.
3 W/V % NaCl brine.
1 V/V % surfactant concentration based on total volume (CS2+aqueous).
Emulsion making temperature conditions at 23° C.
Increasing Homogenizer shear rates from 500 to 10,000 rpm.
Immediate stability observations after shearing.
3.2 Results
The results are presented in Table 1 below.

TABLE 1

Experimental results for emulsion phase fractions measured immediately after shearing using the experimental parameters described in section 3.1. The emulsions were made with four different shear rates.

| SURFACTANT | | Phase volume fraction after shearing for 5 min at specified rpm | | | |
|---|---|---|---|---|---|
| | | 500 rpm | 2,350 rpm | 6,700 rpm | 10,600 rpm |
| Igepal CA 630 | Free Brine = | 0% | 0% | 0% | 0% |
| | Emulsion = | 33% | 50% | 90% | 98% |
| | free CS2 = | 67% | 50% | 10% | 2% |
| Plurafac D25 | Free Brine = | 0% | 0% | 0% | 0% |
| | Emulsion = | 26% | 31% | 38% | 38% |
| | free CS2 = | 74% | 69% | 62% | 62% |
| Tergitol 15-S-5 | Free Brine = | 0% | 0% | 0% | 0% |
| | Emulsion = | 35% | 74% | 94% | 95% |
| | free CS2 = | 65% | 26% | 6% | 5% |
| Neodol 1-12 | Free Brine = | 0% | 0% | 0% | 0% |
| | Emulsion = | 33% | 61% | 83% | 98% |
| | free CS2 = | 67% | 39% | 17% | 2% |
| Neodol 5-20 | Free Brine = | 0% | 0% | 0% | 0% |
| | Emulsion = | 25% | 35% | 38% | 38% |
| | free CS2 = | 75% | 65% | 62% | 62% |

TABLE 2

Experimental results for the second round of HIPR CS2 emulsion systems measured immediately after shearing. The testing was done using a lower surfactant concentration of 0.5% by volume at a shear rate setting of 10,600 rpm.

| SURFACTANT | | CS2 volume fraction before shearing | | | |
|---|---|---|---|---|---|
| | | 75% | 85% | 87.50% | 90% |
| Igepal CA 630 | Free Brine = | 0% | ND | ND | 0% |
| | Emulsion = | 57% | ND | ND | 19% |
| | Free CS2 = | 43% | ND | ND | 81% |

TABLE 2-continued

Experimental results for the second round of HIPR CS2 emulsion systems measured immediately after shearing. The testing was done using a lower surfactant concentration of 0.5% by volume at a shear rate setting of 10,600 rpm.

|  |  | CS2 volume fraction before shearing | | | |
|---|---|---|---|---|---|
| SURFACTANT |  | 75% | 85% | 87.50% | 90% |
| Tergitol 15-S-5 | Free Brine = | 0% | 0% | ND | ND |
|  | Emulsion = | 92% | 28% | ND | ND |
|  | Free CS2 = | 11% | 72% | ND | ND |
| Neodol 1-12 | Free Brine = | 0% | 0% | 0% | 0% |
|  | Emulsion = | 98% | 88% | 98% | 33% |
|  | Free CS2 = | 2% | 12% | 2% | 67% |

ND = Not determined

Stability Results for Neodol 1-12 HIPR Emulsions

A systematic HIPR CS2 solvent emulsion stability study was repeated with Neodol 1-12 for the following variables.
CS2 volume fraction before shearing.
Surfactant concentration.
Brine salinity.
Short-term and long-term stability data.

Table 3 shows the stability results for Neodol 1-12 HIPR emulsions immediately and long-term using the variables described before.

TABLE 3

|  |  | CS2 Volume Fraction Before Shearing | | | | | | |
|---|---|---|---|---|---|---|---|---|
|  |  | 75% V/V % CS2 | | 85% V/V % CS2 | | 87.5% V/V % CS2 | | 88.75% V/V % |
| Conditions |  | Immediate Stability | After 1 h | Immediate Stability | After 1 h | Immediate Stability | After 80 h | Immediate Stability |
| 2 w/V % NaCl | Free Brine = | 0% | 11% | ND | ND | ND | ND | ND |
| 1 V/V % concentration | Emulsion = | 98% | 86% | ND | ND | ND | ND | ND |
| Stability after t - 72 h | Free CS2 = | 2% | 2% | ND | ND | ND | ND | ND |
|  | CS2 Internal Rate* = | 74% | 84% | ND | ND | ND | ND | ND |
| 3 w/V % NaCl | Free Brine = | 0% | 10% | 0% | 5% | 0% | 4% | ND |
| 0.5 V/V % concentration | Emulsion = | 98% | 89% | 99% | 94% | 98% | 94% | ND |
| Stability after t - 12 h | Free CS2 = | 2% | 1% | 1% | 1% | 2% | 2% | ND |
|  | CS2 Internal Ratio = | 74% | 83% | 85% | 89% | 87% | 91% | ND |
| 1.5 w/V % NaCl | Free Brine = | ND | ND | ND | ND | 0% | 4% | 0% |
| 0.5 V/V % concentration | Emulsion = | ND | ND | ND | ND | 99% | 95% | 43% |
| Stability after t - 80 h | Free CS2 = | ND | ND | ND | ND | 1% | 1% | 57% |
|  | CS2 Internal Ratio = | ND | ND | ND | ND | 87% | 89% | 74% |
| D. I. Water | Free Brine = | ND | ND | ND | ND | 0% | 4% | ND |
| 0.5 V/V % concentration | Emulsion = | ND | ND | ND | ND | 44% | 40% | ND |
| Stability after t - 80 h | Free CS2 = | ND | ND | ND | ND | 56% | 56% | ND |
|  | CS2 Internal Ratio = | ND | ND | ND | ND | 72% | 79% | ND |
| 1.5 w/V % NaCl | Free Brine = | ND | ND | ND | ND | 0% | ND | ND |
| 0.4 V/V % concentration | Emulsion = | ND | ND | ND | ND | 43% | ND | ND |
|  | Free CS2 = | ND | ND | ND | ND | 57% | ND | ND |
|  | CS2 Internal Ratio = | ND | ND | ND | ND | 71% | ND | ND |
| 3 w/V % NaCl | Free Brine = | ND | ND | ND | ND | 0% | ND | ND |
| 0.4 V/V % concentration | Emulsion = | ND | ND | ND | ND | 33% | ND | ND |
|  | Free CS2 = | ND | ND | ND | ND | 67% | ND | ND |
|  | CS2 Internal Ratio = | ND | ND | ND | ND | 62% | ND | ND |
| Sea water | Free Brine = | ND | ND | ND | ND | 0% | ND | ND |
| 0.4 V/V % concentration | Emulsion = | ND | ND | ND | ND | 34% | ND | ND |
|  | Free CS2 = | ND | ND | ND | ND | 66% | ND | ND |
|  | CS2 Internal Ratio = | ND | ND | ND | ND | 63% | ND | ND |

ND — Not determined
*Note: The CS2 internal ratio is determined for the emulsion fraction.

Illustrative Embodiments

In one embodiment of the invention, there is disclosed a system for producing oil and/or gas from an underground formation comprising a miscible solvent source; an emulsion manufacturer to produce an emulsion comprising the miscible solvent; an emulsion storage facility adapted to store at least about 5000 gallons of the emulsion; a first array of wells dispersed above the formation; a second array of wells dispersed above the formation; wherein the first array of wells comprises a mechanism to inject the miscible solvent and/or the emulsion into the formation while the second array of wells comprises a mechanism to produce oil and/or gas from the formation. In some embodiments, the miscible solvent comprises carbon disulfide. In some embodiments, the miscible solvent comprises carbon disulfide, and wherein the miscible solvent source comprises a sulfur source and a carbon source and at least one reactor to produce carbon disulfide from the sulfur source and the carbon source. In some embodiments, the sulfur source comprises hydrogen sulfide. In some embodiments, the carbon source comprises at least one of C15 and higher hydrocarbons, petroleum hydrocarbons, bitumen, and natural gas. In some embodiments, the emulsion comprises from about 50% to about 99% by volume of the miscible solvent. In some embodiments, the emulsion comprises from about 1% to about 50% by volume of water. In some embodiments, the emulsion comprises from about 0.025% to about 30% by volume of a surfactant. In some embodiments, the surfactant comprises at least one of an anionic, cationic, non-ionic, zwitterionic surfactants, and mixtures thereof. In some embodiments, the emulsion is stored for a period of at least one week. In some embodiments, the system also includes an emulsion breaker connected to the storage facility and the first array of wells.

In one embodiment of the invention, there is disclosed a system for producing oil and/or gas from an underground formation comprising a miscible solvent source; an emulsion manufacturer to produce an emulsion comprising the miscible solvent; an emulsion transportation facility adapted to transport the emulsion at least about 10 kilometers to the underground formation; a first array of wells dispersed above the formation; a second array of wells dispersed above the formation; wherein the first array of wells comprises a mechanism to inject the miscible solvent and/or the emulsion into the formation while the second array of wells comprises a mechanism to produce oil and/or gas from the formation. In some embodiments, the miscible solvent comprises carbon disulfide. In some embodiments, the miscible solvent comprises carbon disulfide, and wherein the miscible solvent source comprises a sulfur source and a carbon source and at least one reactor to produce carbon disulfide from the sulfur source and the carbon source. In some embodiments, the sulfur source comprises hydrogen sulfide. In some embodiments, the carbon source comprises at least one of C15 and higher hydrocarbons, petroleum hydrocarbons, bitumen, and natural gas. In some embodiments, the emulsion comprises from about 50% to about 99% by volume of the miscible solvent. In some embodiments, the emulsion comprises from about 1% to about 50% by volume of water. In some embodiments, the emulsion comprises from about 0.025% to about 30% by volume of a surfactant. In some embodiments, the surfactant comprises at least one of an anionic, cationic, non-ionic, zwitterionic surfactants, and mixtures thereof. In some embodiments, the emulsion is stored for a period of at least one week near the first array of wells. In some embodiments, the system also includes an emulsion breaker located near the underground formation and connected to the first array of wells.

Those of skill in the art will appreciate that many modifications and variations are possible in terms of the disclosed embodiments of the invention, configurations, materials and methods without departing from their spirit and scope. Accordingly, the scope of the claims appended hereafter and their functional equivalents should not be limited by particular embodiments described and illustrated herein, as these are merely exemplary in nature.

That which is claimed is:

1. A system for producing oil or gas from an underground formation comprising:
   a miscible solvent source;
   an emulsion manufacturer to produce an emulsion comprising the miscible solvent;
   an emulsion storage facility adapted to store at least about 5000 gallons of the emulsion;
   a first array of wells dispersed above the formation;
   an emulsion breaker connected to the storage facility and the first array of wells, where the emulsion breaker is adapted to break the emulsion comprising the miscible solvent; and
   a second array of wells dispersed above the formation;
   wherein the first array of wells comprises a mechanism to inject the miscible solvent from the emulsion breaker into the formation while the second array of wells comprises a mechanism to produce oil or gas from the formation.

2. The system of claim 1, wherein the miscible solvent comprises carbon disulfide.

3. The system of claim 1, wherein the miscible solvent comprises carbon disulfide, and wherein the miscible solvent source comprises a sulfur source and a carbon source and at least one reactor to produce carbon disulfide from the sulfur source and the carbon source.

4. The system of claim 3, wherein the sulfur source comprises hydrogen sulfide.

5. The system of claim 3, wherein the carbon source comprises at least one of C15 and higher hydrocarbons, petroleum hydrocarbons, bitumen, and natural gas.

6. The system of claim 1, wherein the emulsion comprises from about 50% to about 99% by volume of the miscible solvent.

7. The system of claim 1, wherein the emulsion comprises from about 1% to about 50% by volume of water.

8. The system of claim 1, wherein the emulsion comprises from about 0.025% to about 30% by volume of a surfactant.

9. The system of claim 8, wherein the surfactant comprises at least one of an anionic, cationic, non-ionic, zwitterionic surfactants, and mixtures thereof.

10. A system for producing oil or gas from an underground formation comprising:
    a miscible solvent source;
    an emulsion manufacturer to produce an emulsion comprising the miscible solvent;
    an emulsion transportation facility adapted to transport the emulsion at least about 10 kilometers to the underground formation;
    a first array of wells dispersed above the formation;
    an emulsion breaker located near the underground formation and connected to the first array of wells, where the emulsion breaker is adapted to break the emulsion comprising the miscible solvent; and
    a second array of wells dispersed above the formation;
    wherein the first array of wells comprises a mechanism to inject the miscible solvent from the emulsion breaker into the formation while the second array of wells comprises a mechanism to produce oil or gas from the formation.

11. The system of claim 10, wherein the miscible solvent comprises carbon disulfide.

12. The system of claim 10, wherein the miscible solvent comprises carbon disulfide, and wherein the miscible solvent source comprises a sulfur source and a carbon source and at least one reactor to produce carbon disulfide from the sulfur source and the carbon source.

13. The system of claim 12, wherein the sulfur source comprises hydrogen sulfide.

14. The system of claim 12, wherein the carbon source comprises at least one of C15 and higher hydrocarbons, petroleum hydrocarbons, bitumen, and natural gas.

15. The system of claim 10, wherein the emulsion comprises from about 50% to about 99% by volume of the miscible solvent.

16. The system of claim 10, wherein the emulsion comprises from about 1% to about 50% by volume of water.

17. The system of claim 10, wherein the emulsion comprises from about 0.025% to about 30% by volume of a surfactant.

18. The system of claim 17, wherein the surfactant comprises at least one of an anionic, cationic, non-ionic, zwitterionic surfactants, and mixtures thereof.

\* \* \* \* \*